United States Patent
Pacella

(10) Patent No.: US 12,258,774 B2
(45) Date of Patent: Mar. 25, 2025

(54) CANOPY BOW ASSEMBLY SECURED BY A SNAP CLIP

(71) Applicant: WONDERLAND SWITZERLAND AG, Steinhausen (CH)

(72) Inventor: Jonathan M. Pacella, Gap, PA (US)

(73) Assignee: Wonderland Switzerland AG, Steinhausen (CH)

( * ) Notice: Subject to any disclaimer, the term of this patent is extended or adjusted under 35 U.S.C. 154(b) by 118 days.

(21) Appl. No.: 17/781,939

(22) PCT Filed: Nov. 26, 2020

(86) PCT No.: PCT/EP2020/083517
§ 371 (c)(1),
(2) Date: Jun. 2, 2022

(87) PCT Pub. No.: WO2021/110537
PCT Pub. Date: Jun. 10, 2021

(65) Prior Publication Data
US 2022/0372783 A1    Nov. 24, 2022

Related U.S. Application Data

(60) Provisional application No. 62/943,409, filed on Dec. 4, 2019.

(51) Int. Cl.
*A47D 13/06* (2006.01)
*A47C 7/66* (2006.01)
(Continued)

(52) U.S. Cl.
CPC ............... *E04H 15/64* (2013.01); *A47C 7/66* (2013.01); *A47C 29/003* (2013.01);
(Continued)

(58) Field of Classification Search
CPC .......... F16B 7/0433; F16B 2/22; E04H 15/64; E04H 15/006; A47C 7/66; A47C 29/003;
(Continued)

(56) References Cited

U.S. PATENT DOCUMENTS 244,217 A      7/1881   Fenner
316,062 A  *   4/1885   Riessner .................. A47K 1/09
                                                  24/339
(Continued)

FOREIGN PATENT DOCUMENTS

CN      1328803 A      1/2002
CN      1572185        2/2005
(Continued)

OTHER PUBLICATIONS

International Search Report and Written Opinion for PCT/EP2020/083517 dated Mar. 12, 2021.
(Continued)

*Primary Examiner* — Robert Canfield
(74) *Attorney, Agent, or Firm* — Volpe Koenig

(57) ABSTRACT

A snap clip adapted to mount a canopy bow to an article of furniture including a tube includes a socket and a clip body. The socket defines a mounting space adapted for the canopy bow to be mounted therein. The clip body is connected to the socket and is removably mounted to the tube. The clip body defines a retaining space facing inwardly toward an interior of the article of furniture and adapted for retaining the tube.

19 Claims, 9 Drawing Sheets

(51) Int. Cl.
  *A47C 29/00* (2006.01)
  *A47D 15/00* (2006.01)
  *E04H 15/40* (2006.01)
  *E04H 15/64* (2006.01)
  *F16B 7/04* (2006.01)

(52) U.S. Cl.
  CPC ........... *A47D 13/063* (2013.01); *A47D 15/00* (2013.01); *E04H 15/40* (2013.01); *F16B 7/0433* (2013.01)

(58) Field of Classification Search
  CPC ... A47C 7/664; Y10T 24/344; Y10T 24/3444; Y10T 403/3906; Y10T 403/7129; Y10T 403/7176; A47D 13/063; A47D 15/00; A47D 13/06
  USPC .. 248/219.4, 229.16, 231.81, 534, 535, 539, 248/540; 135/120.3
  See application file for complete search history.

(56) References Cited

U.S. PATENT DOCUMENTS

| | | | |
|---|---|---|---|
| 406,715 A | 7/1889 | Fenner | |
| 609,491 A | 8/1898 | Ashwell | |
| 927,738 A | 7/1909 | Malaby | |
| 1,264,078 A | 4/1918 | Jaureguy | |
| 1,950,603 A | 3/1934 | Fischer | |
| 2,243,984 A | 6/1941 | Singewald | |
| 2,357,056 A * | 8/1944 | Nelson | A47C 29/006 135/96 |
| 2,471,540 A | 5/1949 | Phillips | |
| 2,624,054 A | 1/1953 | Plant | |
| 2,698,443 A | 1/1955 | Ralick | |
| 2,820,468 A * | 1/1958 | Park | A47D 7/00 135/117 |
| 3,206,772 A | 9/1965 | Sarasin | |
| 3,521,332 A * | 7/1970 | Kramer | F16L 3/13 248/912 |
| 4,030,748 A * | 6/1977 | Brock | A47C 7/66 135/96 |
| 4,186,454 A | 2/1980 | Cone | |
| 4,389,057 A * | 6/1983 | Richard, Jr. | A61G 5/10 297/184.12 |
| 4,651,367 A | 3/1987 | Osher et al. | |
| 4,790,340 A | 12/1988 | Mahoney | |
| 4,809,724 A * | 3/1989 | Fuser | A47C 7/66 248/514 |
| 4,871,141 A * | 10/1989 | Chen | A47C 7/66 248/534 |
| 5,000,210 A * | 3/1991 | Worthington, Jr. | A47C 7/66 135/96 |
| 5,022,420 A * | 6/1991 | Brim | A01D 67/02 280/47.38 |
| 5,099,866 A | 3/1992 | Solis et al. | |
| 5,203,363 A * | 4/1993 | Kidwell | A61G 5/10 135/96 |
| 5,290,050 A | 3/1994 | Kim | |
| 5,339,470 A | 8/1994 | Shamie | |
| 5,396,915 A * | 3/1995 | Bomar | A45B 11/00 403/397 |
| 5,431,364 A * | 7/1995 | Etter | A45B 11/00 248/514 |
| 5,517,707 A | 5/1996 | Lamantia | |
| D371,262 S * | 7/1996 | Forbes, Sr. | D6/716.8 |
| 5,697,129 A * | 12/1997 | Newville | B25F 1/02 24/339 |
| 5,778,465 A | 7/1998 | Myers | |
| 5,957,436 A | 9/1999 | Ristau | |
| 6,035,877 A | 3/2000 | Losi, Jr. et al. | |
| 6,067,676 A | 5/2000 | Carnahan et al. | |
| 6,231,119 B1 | 5/2001 | Zheng | |
| 6,279,208 B1 | 8/2001 | Gillis | |
| 6,438,773 B1 | 8/2002 | Hsia | |
| 6,467,107 B1 * | 10/2002 | Glover | A47C 7/66 5/99.1 |
| 6,494,427 B1 * | 12/2002 | Smith | A01D 34/001 224/401 |
| 6,764,133 B2 * | 7/2004 | Osato | A47D 1/08 297/184.13 |
| 6,865,756 B2 | 3/2005 | Clapper et al. | |
| 6,915,545 B2 | 7/2005 | Chen | |
| 6,925,664 B1 | 8/2005 | Twigg | |
| 6,948,197 B1 | 9/2005 | Chen | |
| 7,096,874 B2 | 8/2006 | Forshpan | |
| 7,226,126 B1 * | 6/2007 | Spanovich | A47C 4/286 248/539 |
| 7,243,990 B1 * | 7/2007 | Wahl | A47C 7/66 297/184.15 |
| 7,401,367 B2 | 7/2008 | Gehr et al. | |
| 7,418,746 B2 | 9/2008 | Gehr et al. | |
| 7,422,026 B2 | 9/2008 | Kim | |
| 7,458,115 B2 | 12/2008 | Chen et al. | |
| 7,568,243 B2 | 8/2009 | Gehr et al. | |
| 7,617,550 B2 | 11/2009 | Gehr et al. | |
| 7,694,361 B1 | 4/2010 | Chen | |
| 7,752,693 B2 | 7/2010 | Espenshade | |
| 7,770,245 B2 | 8/2010 | Cheng et al. | |
| 7,891,369 B2 | 2/2011 | Carter | |
| 8,024,825 B2 | 9/2011 | Harrison et al. | |
| 8,186,368 B2 * | 5/2012 | Troutman | B62B 9/14 135/88.02 |
| 8,388,501 B2 | 3/2013 | Myers et al. | |
| 8,464,379 B1 * | 6/2013 | Zajac | A61G 1/04 5/113 |
| D725,424 S * | 3/2015 | Cohen | D6/716.8 |
| 8,967,171 B2 * | 3/2015 | Horst | B62B 7/008 135/88.02 |
| 8,973,180 B2 * | 3/2015 | Zeng | A47D 9/016 5/99.1 |
| 8,984,682 B2 | 3/2015 | Zhao | |
| 8,997,770 B1 * | 4/2015 | Martin | A47C 7/666 135/88.13 |
| 9,066,607 B1 | 6/2015 | Ransil et al. | |
| 9,089,225 B2 * | 7/2015 | Fiore, III | A47D 13/06 |
| 9,113,723 B2 | 8/2015 | Gregor et al. | |
| 9,144,325 B1 | 9/2015 | Sousa et al. | |
| 9,345,339 B2 | 5/2016 | Wang et al. | |
| 9,770,118 B2 | 9/2017 | Mountz | |
| 9,955,801 B2 | 5/2018 | Yu | |
| 10,006,195 B2 | 6/2018 | Matsuoka | |
| 10,194,755 B1 | 2/2019 | Flannery et al. | |
| RE47,525 E | 7/2019 | Sousa et al. | |
| 10,448,752 B1 | 10/2019 | Flannery et al. | |
| 10,674,835 B1 | 6/2020 | Flannery et al. | |
| 10,704,290 B1 | 7/2020 | Flannery et al. | |
| RE48,148 E | 8/2020 | Wang et al. | |
| 11,185,167 B1 * | 11/2021 | Holland | A47C 7/666 |
| 11,266,253 B1 | 3/2022 | Flannery et al. | |
| 11,596,242 B1 | 3/2023 | Flannery et al. | |
| 11,696,652 B2 | 7/2023 | Pacella | |
| 2004/0237191 A1 | 12/2004 | Clapper et al. | |
| 2005/0034232 A1 | 2/2005 | Martin | |
| 2005/0150046 A1 | 7/2005 | Gehr et al. | |
| 2006/0037274 A1 | 2/2006 | Perez et al. | |
| 2006/0253980 A1 | 11/2006 | Paesang et al. | |
| 2007/0163041 A1 | 7/2007 | Cheng et al. | |
| 2007/0271697 A1 | 11/2007 | Martin | |
| 2008/0018146 A1 * | 1/2008 | Wahl | A47C 7/66 297/184.15 |
| 2008/0034498 A1 | 2/2008 | Chen et al. | |
| 2008/0098530 A1 | 5/2008 | Chen et al. | |
| 2008/0149157 A1 | 6/2008 | Carter | |
| 2008/0289103 A1 | 11/2008 | Gehr et al. | |
| 2008/0289673 A1 | 11/2008 | Roden et al. | |
| 2009/0019637 A1 | 1/2009 | Gehr et al. | |
| 2009/0113625 A1 | 5/2009 | Hutchinson et al. | |
| 2009/0188039 A1 | 7/2009 | Shan et al. | |
| 2009/0188540 A1 | 7/2009 | Mallookis et al. | |
| 2009/0217959 A1 | 9/2009 | Carter | |
| 2010/0045081 A1 * | 2/2010 | Efthimiou | A47C 7/66 297/184.11 |

(56) References Cited

U.S. PATENT DOCUMENTS

| | | |
|---|---|---|
| 2010/0139729 A1 | 6/2010 | Carter |
| 2010/0229301 A1 | 9/2010 | Arnold, IV et al. |
| 2011/0140061 A1 | 6/2011 | Cheng et al. |
| 2012/0037869 A1 | 2/2012 | Fiore et al. |
| 2012/0110730 A1 | 5/2012 | Sousa et al. |
| 2012/0235103 A1 | 9/2012 | Greger et al. |
| 2013/0050975 A1 | 2/2013 | Carpenter |
| 2013/0074257 A1 | 3/2013 | Mendes et al. |
| 2013/0092207 A1 | 4/2013 | Lovley, II et al. |
| 2014/0102497 A1 | 4/2014 | Ma et al. |
| 2014/0165288 A1 | 6/2014 | Wang et al. |
| 2014/0208505 A1 | 7/2014 | Burkholder et al. |
| 2014/0359938 A1 | 12/2014 | Burns et al. |
| 2015/0021453 A1 | 1/2015 | Brassard et al. |
| 2015/0060605 A1 | 3/2015 | Tserodze et al. |
| 2016/0066705 A1 | 3/2016 | Yaacoby et al. |
| 2016/0242566 A1 | 8/2016 | Tadipatri et al. |
| 2016/0369524 A1 | 12/2016 | Huang |
| 2017/0280892 A1 | 10/2017 | Zhang et al. |
| 2017/0290444 A1 | 10/2017 | Mao |
| 2017/0367492 A1 | 12/2017 | Thomson et al. |
| 2018/0014662 A1 | 1/2018 | He et al. |
| 2018/0142493 A1 | 5/2018 | Choi |
| 2018/0192785 A1 | 7/2018 | Horst et al. |
| 2018/0192786 A1 | 7/2018 | Horst |
| 2018/0238075 A1 | 8/2018 | Yang et al. |
| 2018/0332977 A1 | 11/2018 | Sozzo |
| 2019/0142183 A1 | 5/2019 | Mountz |
| 2019/0200781 A1 | 7/2019 | McGittigan |
| 2019/0335917 A1 | 11/2019 | Taylor et al. |
| 2019/0338552 A1 | 11/2019 | Jun |
| 2020/0002968 A1 | 1/2020 | Ferrari et al. |
| 2020/0077807 A1 | 3/2020 | Taylor et al. |
| 2020/0352353 A1 | 11/2020 | Fusco et al. |
| 2020/0407999 A1 | 12/2020 | Huang |
| 2021/0040766 A1 | 2/2021 | Sun et al. |
| 2021/0085098 A1* | 3/2021 | Pacella .................. A47D 7/007 |
| 2021/0372444 A1* | 12/2021 | Staidl ....................... F16B 2/22 |
| 2023/0007889 A1* | 1/2023 | Pacella ................. A47D 13/063 |
| 2023/0010207 A1* | 1/2023 | Pacella ................ A47C 29/003 |
| 2023/0175283 A1* | 6/2023 | Liu ........................ A47D 15/00 |
| | | 135/126 |

FOREIGN PATENT DOCUMENTS

| | | |
|---|---|---|
| CN | 2682940 | 3/2005 |
| CN | 100551304 | 10/2009 |
| CN | 201670256 U | 12/2010 |
| CN | 301602286 | 7/2011 |
| CN | 202858551 | 4/2013 |
| CN | 203332191 U | 12/2013 |
| CN | 103565169 A | 2/2014 |
| CN | 103859873 | 6/2014 |
| CN | 104398070 A | 3/2015 |
| CN | 204445034 | 7/2015 |
| CN | 204970498 | 1/2016 |
| CN | 103156444 | 2/2016 |
| CN | 205093999 U | 3/2016 |
| CN | 106150324 A | 11/2016 |
| CN | 208676779 U | 4/2019 |
| CN | 208676799 | 4/2019 |
| CN | 208973109 | 6/2019 |
| CN | 209053512 U | 7/2019 |
| CN | 209331573 | 9/2019 |
| CN | 209331574 | 9/2019 |
| EP | 1593324 | 11/2005 |
| EP | 1911376 | 4/2008 |
| EP | 3088065 | 11/2017 |
| EP | 3979880 | 4/2022 |
| EP | 4069039 | 10/2022 |
| EP | 4069040 | 10/2022 |
| FR | 1053010 | 1/1954 |
| FR | 2361846 | 3/1978 |
| GB | 2471540 | 1/2011 |
| JP | S493850 U | 4/1947 |
| JP | S49003850 | 4/1947 |
| JP | S60146452 U | 9/1985 |
| JP | 4508962 B2 | 2/2014 |
| JP | 5408962 B2 | 2/2014 |
| JP | 2019-30388 A | 2/2019 |
| JP | 201938388 | 2/2019 |
| WO | 82/01984 | 6/1982 |
| WO | 99/020160 | 4/1999 |
| WO | 2009002188 A1 | 12/2008 |
| WO | 2013096595 A1 | 6/2013 |
| WO | 2016062164 | 4/2016 |
| WO | 2021023873 | 2/2021 |
| WO | 2021113720 | 6/2021 |
| WO | 2021113723 | 6/2021 |

OTHER PUBLICATIONS

Overstock(TM), "Overstock.com: Online Shopping—Bedding, Furniture, Electronics, Jewelry, Clothing & more", May 23, 2017 (May 23, 2017), Retrieved from the Internet: URL:https://www.overstock.com/Baby/Summer-Infant-Pop-N-Play-Shade-Canopy-Portable-Playard/10406172/product.html?utm_source=pinterest.com&utm_medium=referral&utm_campaign=pin_button XP055780628.

International Search Report and Written Opinion mailed Apr. 28, 2021 for PCT International Application No. PCT/US2020/063427.

International Search Report and Written Opinion mailed Jun. 2, 2021 for PCT International Application No. PCT/US2021/013831.

Wash & Fold Portable Baby Circle. Nihon Ikuji. First found on Feb. 22, 2021. Last accessed at https://nihonikuji.com/item/araetetatameru_circle_cf/ on Mar. 17, 2021.12 pages.

International Search Report and Written Opinion mailed Oct. 14, 2021 for PCT International Application No. PCT/US2021/031634.

U.S. Appl. No. 62/883,716 (filed Aug. 7, 2019).

U.S. Appl. No. 62/979,728 (filed Feb. 21, 2020).

International Search Report and Written Opinion in International Patent Application No. PCT/US2020/063424 mailed Mar. 9, 2021, 27 pages.

10 Best Baby Playpens 2018. Ezvid Wiki Apr. 13, 2018 Youtube. Accessed at https://www.youtube.com/watch?u=qzvuGglUma48't=99s. 1 page.

2017 Hot Sale Indoor and Outdoor Foldable Baby Safety Fence Playpen. Ningbo Sunnuo International Trade Co. First found on Oct. 30, 2020. Last accessed at http://sunnuotrade.waimaotong.com/product/2017-Hot-Sale-Indoor-and-Dutdoor-Foldable-Baby-Safety-Fence-Playpen_m1227918m.html on Mar. 17, 2021. 6 pages.

5 Comfiest Playpens and Playards for Your Child's Rest and Play. Cool Things Youtube Jun. 8, 2019. Accessed at hittps://www.youtube.com/watch?v=rTcyfrHr6Ao&t=42s. 1 page.

Baby Delight Go With Me Nod Travel Crib Product Page. Baby Delight. First found on Feb. 4, 2021. Last accessed at https://babydelight.com/product/go-with-me-nod-deluxe-portable-travel-crib-charcoal-tweed/ on Mar. 17, 2021. 11 pages.

Baby Delight Go with Me Nod Deluxe Portable Travel Crib. Target. First found on Feb. 1, 2021. Last accessed at https://www.target.com/p/baby-delight-go-with-me-nod-deluxe-portable-travel-crib/-/A-80369220#Ink=sametab on Mar. 17, 2021.8 pages.

Baby Delight Go With Me Nod JPMA 2019. Albee Baby Youtube Apr. 29, 2019. Accessed at https://www.youtube.com/watch?v=OsbKtzVEL-8&t=5s. 1 page.

Cove Aire Instructions. Nuna created Dec. 10, 2019. 15 pages.

Deluxe Foldaway Playpen. Koo Di. First found on Oct. 30, 2020. Last accessed at https://koo-di.com/products/deluxe-foldaway-playpen on Mar. 17, 2021. 3 pages.

Evenflo Play-Away Portable Playard Deluxe, Wayfarer. Evenflo Walmart. First found on Jul. 15, 2020. Last accessed at https://www.walmart.com/ip/Evenflo-Play-Away-Portable-Playard-Deluxe-Wayfarer/154959146 on Mar. 17, 2021. 8 pages.

Go With Me Nod Travel Crib Care & Instructions. Baby Delight 2018. Accessed at https://mkObabydelightbwx00d.kinstacdn.com/wp-content/uploads/2019-10-27_BD05350_GWM-Nod-Travel-CribUB.pdf. 8 pages.

(56) References Cited

OTHER PUBLICATIONS

Hexa Playpen. Tutti Bambini. First found on Oct. 30, 2020. Last accessed at https://www.tuttibambini.com/hexaplaypen-grey.html on Mar. 17, 2021.4 pages.
How to Set Up a Nuna SENA Aire Travel Crib—Babylist. Babylist Youtube Jul. 4, 2018. Accessed at https://www.youtube.com/watch?v=y4NoFgd_10M&t=35s. 1 page.
International Search Report and Written Opinion in International Patent Application No. PCT/EP2020/072290 mailed Dec. 2, 2020, 22 pages.
Nuna COVE™ Aire Travel Crib. Pottery Barn Kids. First found on Jan. 11, 2021. Last accessed at https://www.potterybaraids.com/products/nuna-cove-aire-travel-crib/ on Mar. 17, 2021. 2 pages.
Onyx Playpen. Dream on Me. First found on Aug. 12, 2020. Last accessed at https://dreamonme.com/products/Baby-gears/playpens-playards/onyx-playpen/ on Mar. 18, 2021.3 pages.
Pack 'n Play® On the Go™ Playard with Folding Bassinet. Graco. First found on Jan. 11, 2021. Last accessed at https://www.gracobaby.com/home-and-gear/pack-n-play-playards-and-bassinets/pack-n-play-playards/pack-n-play-onhe-go-playard-with-folding-bassinet/SAP_2120159.html on Mar. 17, 2021.4 pages.
Pack 'n Play Care Suite Bassinet Playard Owner's Manual. Graco Jun. 2020. 32 pages.
Pack'n Play on the Go Playard Owner's Manual. Graco Apr. 30, 2020. 28 pages.
Pack'n Play on the Go Playard Owner's Manual. Graco Jun. 2011. 28 pages.
Pack 'n Play Sport Playard Owner's Manual. Graco Dec. 12, 2014. 20 pages.
Pack 'n Play® Sport Playard. Graco. First found on Jul. 15, 2020. Last accessed at https://www.gracobaby.com/home-and-gear/pack-n-play-playards-and-bassinets/pack-n-play-playards/pack-n-play-sport-playard/SAP_1926867.html on Mar. 17, 2021.
Pop 'N Play® Lite Playard. Summer Infant, Inc. First found on Jul. 15, 2020. Last accessed at https://www.summerinfant.com/all-safety-health/pop-%E2%80%98n-play-lite-playard on Mar. 17, 2021. 5 pages.
Pop 'N Play LITE Playard Owner's Manual. Summer Infant, Inc. Nov. 4, 2019.2 pages.
Portable Playard Play Pen for Infants and Babies. Babyseater. First found on Jul. 15, 2020. Last accessed at https://babyseaterus/product/portable-playard-play-pen-for-infants-and-babies-lightweight-mesh-baby-playpen-with-carryingaase-easily-opens-with-1-hand-turquoise/ on Mar. 17, 2021.8 pages.
Portable Playpen. Deryan. First found on Oct. 30, 2020. Last accessed at https://deryan.shop/en/product/portableplaypen/ on Mar. 17, 2021.3 pages.
Portable Playpen. MTVVML Amazon. First found on Oct. 30, 2020. Last accessed at https://www.amazon.sg/Portable-Playpen-Foldable-Washable-Lightweight/dp/B07XKYPYHH on Mar. 17, 2021. 3 pages.
Quick Connect Portable Seat Playard Owner's Manual. Graco Nov. 2019.40 pages.
Sena Aire Instructions. Nuna created Feb. 8, 2017. 23 pages.
Sena Aire Instructions. Nuna Jul. 2019. 13 pages.
Sena Aire Mini Product Page. Nuna. First found on Jan. 11, 2021. Last accessed at https://www.nunababy.com/usa/sena-aire-mini on Mar. 17, 2021.8 pages.
Sena Aire Product Page. Nuna. First found on Jan. 11, 2021. Last accessed at https://www.nunababy.com/en/ on Mar. 17, 2021.7 pages.
Sena Product Page. Nuna. First found on Jan. 11, 2021. Last accessed at https://www.nunababy.com/en/sena on Mar. 17, 2021.8 pages.
Sunnuo 2019 Foldable Baby Safety Fence Playpen. Sunnuo Mar. 31, 2019. Accessed at Wayback machine at http://www.sunnuotrade.com/product/60697008483305426022/2019_Hot_Sale_Indoor_and_Outdoor Foldable_Baby_Safety_Fence_Playpen.html. 9 pages.
Venture All Stars JOY Foldable Playpen. Venture UK. First found on Oct. 30, 2020. Last accessed at https://www.ventureuk.com/product/venture-all-stars-joy-baby-playpen-grey/ on Mar. 18, 2021.3 pages.
Office Action issued in Taiwanese Application No. 111119166 dated Mar. 9, 2023.
International Search Report mailed on Oct. 15, 2020 for International application No. PCT/EP2020/072290, International filing date: Aug. 7, 2020.
Canadian Office Action for Application No. 3160783 dated Aug. 30, 2023.
Canadian Office Action for Application No. 3149329 dated Sep. 1, 2023.
Canadian Office Action for Application No. 3160780 dated Sep. 13, 2023.
Australian Examination Report for Application No. 2021207544 dated Sep. 11, 2023.
Non-Final Office Action for U.S. Appl. No. 18/158,246 dated Jul. 19, 2023.
Japanese Office Action for Application No. 2022/056425 dated Jul. 4, 2023. English Machine translation Provided.
European Search Report for Application No. 20895722.5-1005 / 4069039 PCT/US2020063427 dated Jan. 26, 2024.
Office Action and Search Report issued in corresponding Chinese Application No. 202011389121.1 dated Mar. 20, 2024.
Examination Report issued in corresponding Australian Application No. 2021207544 dated Feb. 20, 2024.
Office Action issued in corresponding Taiwanese Application No. 112146385 dated Apr. 18, 2024.
Nuna Sena Playard Review—Baby Gizmo. Baby Gizmo YouTube Jan. 21, 2013. Accessed at: https://www.youtube.com/watch?v=UHN7nsyE7gs&t=20s.
"Extended European Search Report Issued in Corresponding European Patent Application No. 21740798.0", Mailed Date: Jun. 4, 2024, 9 pages.
"Office Action Issued in Corresponding Vietnamese Patent Application No. 1-2022-03843", Mailed Date: Apr. 24, 2024, 4 pages.
"Non-Final Office Action for U.S. Appl. No. 17/782,064", Mailed Date: Apr. 18, 2024, 18 pages.
"Non-Final Office Action for U.S. Appl. No. 18/349,553", Mailed Date: May 28, 2024, 15 pages.
"Written Opinion Issued in Corresponding Singapore Patent Application No. 11202251276J", Mailed Date: Jul. 8, 2024, 6 pages.
"Search Report Issued in Corresponding Singapore Patent Application No. 11202251276J", Mailed Date: Jul. 8, 2024, 3 pages.
Extended European Search Report issued in corresponding application No. 20895722.5 dated Apr. 30, 2024.
"First Office Action Issued in Corresponding Chinese Patent Application No. 202080095666.3", Mailed Date: Jul. 12, 2024, 9 pages.
"Search Report Issued in Corresponding Chinese Patent Application No. 202080095666.3", Mailed Date: Jul. 11, 2024, 3 pages.
"Notice of Allowance Issued in Corresponding Japanese Patent Application No. 2022-543566", Mailed Date: Jul. 16, 2024, 3 pages.
"First Office Action Issued in Corresponding Chinese Patent Application No. 202080095723.8", Mailed Date: Aug. 10, 2024, 13 pages.
"Office Action Issued in Corresponding U.S. Appl. No. 18/158,246", Mailed Date: Jul. 17, 2024, 12 pages.
"Notice of Allowance and Fees Due Issued in Corresponding U.S. Appl. No. 18/349,553", Mailed Date: Sep. 18, 2024, 8 pages.
"Notice of Allowance and Fees Due Issued in Corresponding U.S. Appl. No. 17/782,070", Mailed Date: Sep. 18, 2024, 8 pages.
"First Office Action Issued in Corresponding Chinese Patent Application No. 2020800561141", Mailed Date: Aug. 9, 2024, 22 pages.
"Office Action Issued in Corresponding Korean Patent Application No. 10-2022-7028309", Mailed Date: Sep. 13, 2024, 19 pages.
"Non-Final Office Action Issued in Corresponding U.S. Appl. No. 17/792,847", Mailed Date: Oct. 25, 2024, 17 pages.
"Extended European Search Report Issued in Corresponding European Patent Application No. 24203250.6", Mailed 1 Date: Nov. 25, 2024, 8 pages.

* cited by examiner

CANOPY BOW ASSEMBLY SECURED BY A SNAP CLIP

CROSS-REFERENCE TO RELATED APPLICATIONS

This application is a 371 National Stage Entry of PCT Application No. PCT/EP2020/083517, filed on Nov. 26, 2020, which claims the benefit of U.S. Provisional Patent Application No. 62/943,409, filed on Dec. 4, 2019, the entire disclosures of which are each incorporated by reference herein.

FIELD

The disclosure relates to a snap clip, and more particularly to a snap clip for mounting a canopy bow (a bow-like component to which the canopy is to be attached) to an article of furniture.

BACKGROUND

Currently, there are several playards on the market for outdoor use that include canopies. These canopies are usually attached to top corners of the playard, which are covered by soft goods (such as fabrics). This way of attachment is problematic: it can be difficult for the caregiver to determine where exactly the canopy is to be mounted. Further, when attaching the canopy over the soft goods, secure attachment of a canopy clip may not be ensured because of the gaps among multiple layers of fabric. This may cause the canopy to detach inadvertently by wind or the occupant of the playard pulling on the canopy. For example, commercially available playard canopies may either be pulled off from the playards or be pulled inside of the playards by the occupants.

SUMMARY

Therefore, an object of the disclosure is to provide a snap clip that can alleviate at least one of the drawbacks of the prior art.

According to the disclosure, the snap clip is adapted to mount a canopy bow to an article of furniture including a tube, and includes a socket and a clip body. The socket defines a mounting space adapted for the canopy bow to be mounted therein. The clip body is connected to the socket and is removably mounted to the tube. The clip body defines a retaining space facing inwardly toward an interior of the article of furniture and adapted for retaining the tube.

Another object of the disclosure is to provide a canopy bow assembly that can alleviate at least one of the drawbacks of the prior art.

According to the disclosure, the canopy bow assembly is adapted to be mounted to an article of furniture including a tube, and includes a snap clip and a canopy bow. The snap clip includes a socket and a clip body. The socket defines a mounting space therein. The clip body is connected to the socket and is removably mounted to the tube. The clip body defines a retaining space facing inwardly toward an interior of the article of furniture and adapted for retaining the tube. The canopy bow is mounted in the mounting space of the socket, and is adapted to support a canopy.

The advantages of the disclosure are that: the retaining space of the snap clip is facing inwardly rather than facing downwardly, such that the canopy bow is prevented from being easily pulled off or pulled inside by an occupant; and the canopy bow assembly can be attached to the article of furniture without any additional fasteners and without any alteration or modification to the article of furniture.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
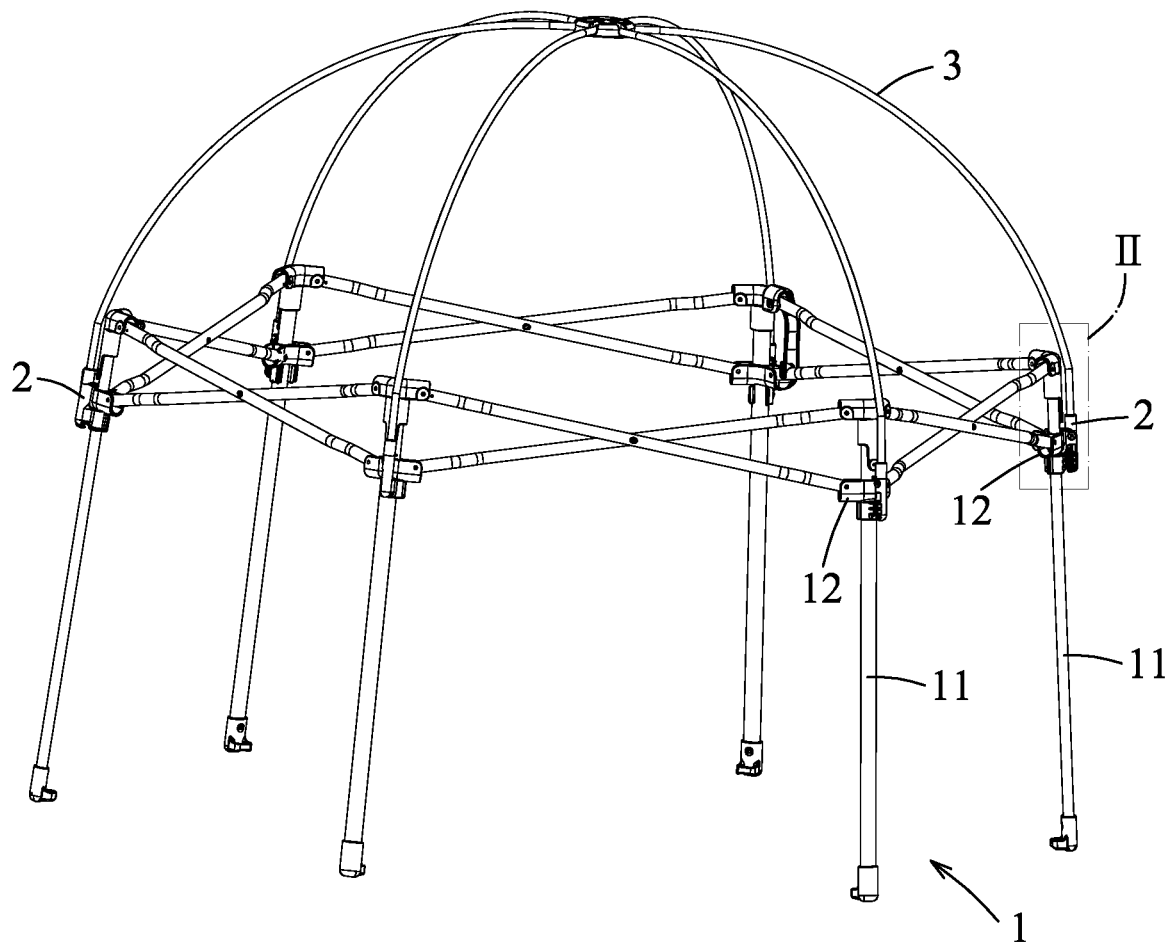
FIG. 1 is a perspective view illustrating a first embodiment of a canopy bow assembly according to the disclosure mounted to an article of furniture.

The disclosure will now be described in greater detail. It should be noted that where considered appropriate, reference numerals or terminal portions of reference numerals have been repeated among the figures to indicate corresponding or analogous elements, which may optionally have similar characteristics.

Figure 2:
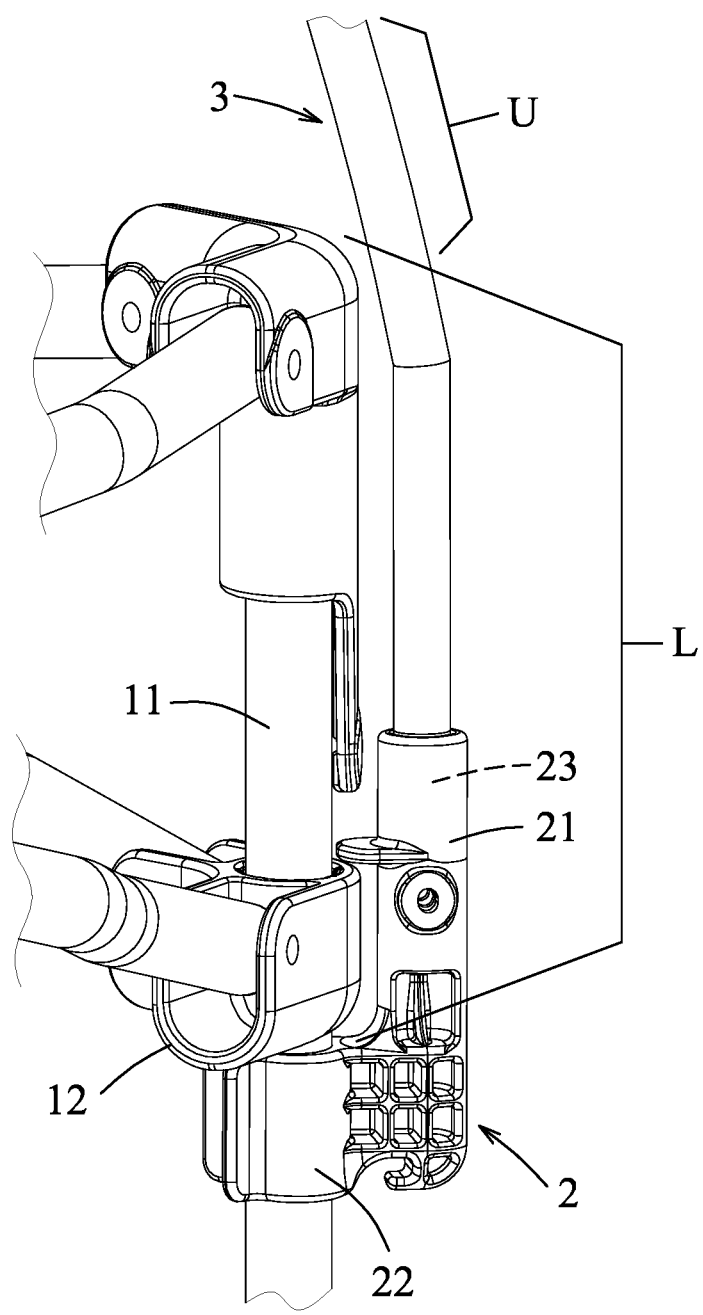
FIG. 2 is an enlarged partial view of the rectangular region II in FIG. 1, illustrating a snap clip and a canopy bow of the canopy bow assembly.

Referring to FIGS. 1 and 2, a first embodiment of the canopy bow assembly according to the disclosure is mounted onto an article of furniture, which is exemplarily a playard 1, for supporting a canopy 5 (see FIG. 5) that provides shade for the playard 1. The playard 1 includes a plurality of tubes 11, and a plurality of linking members 12 that are respectively mounted to the tubes 11. The canopy bow assembly includes a canopy bow 3, and two snap clips 2 that are respectively mounted to two opposite ends of the canopy bow 3. The snap clips 2 are substantially the same in structure. For the sake of brevity, only one snap clip 2 will be described in detail in the following paragraphs.

The snap clip 2 includes a socket 21 and a clip body 22. The socket 21 defines a mounting space 23 therein. The clip body 22 is connected to the socket 21 and is removably mounted to the tube 11. The canopy bow 3 is mounted in the mounting space 23 of the socket 21, and is for supporting the canopy 5.

Figure 3:
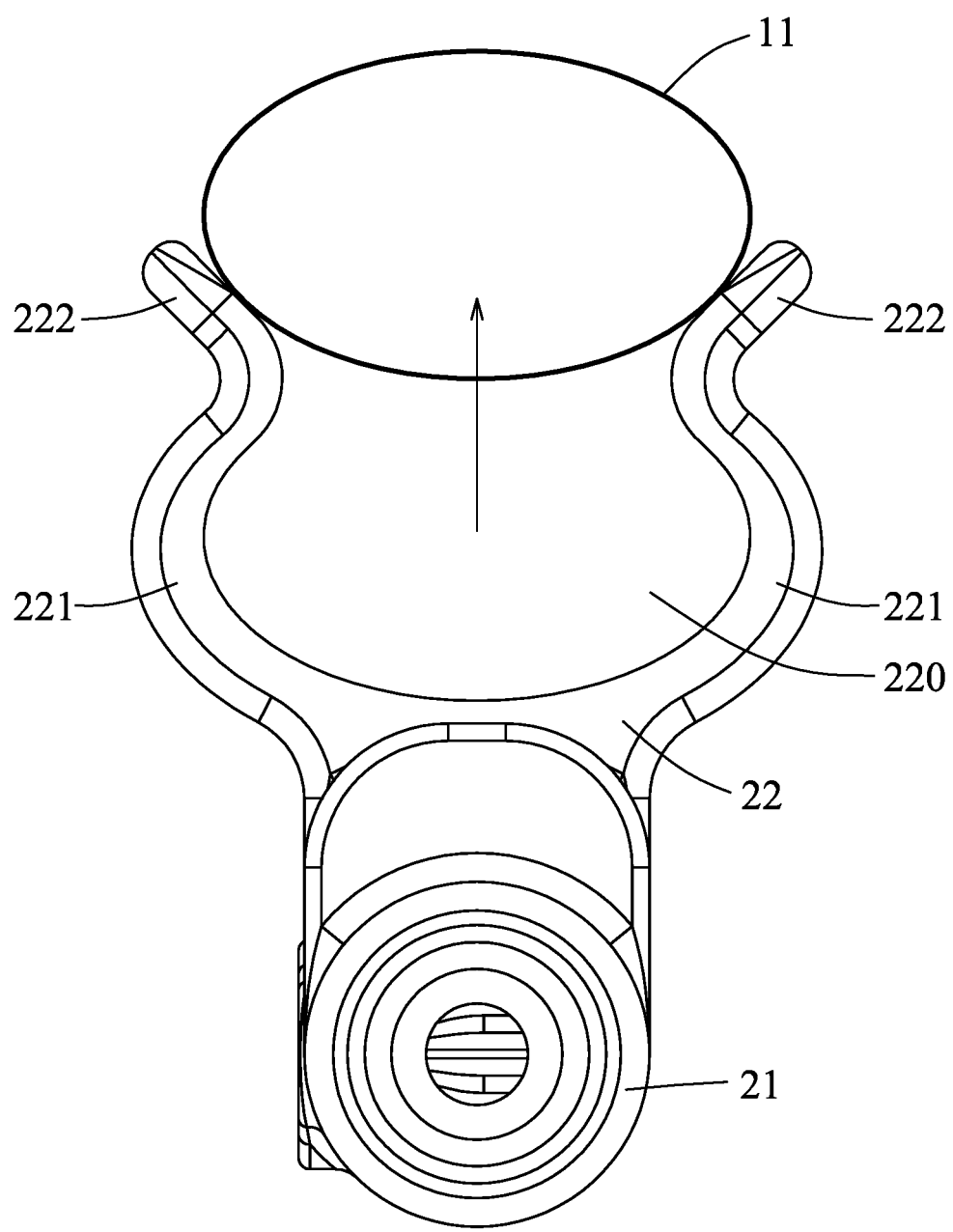
FIG. 3 is a top view illustrating the snap clip being pushed toward a tube of the article of furniture.

Referring further to FIG. 3, the clip body 22 includes two resilient arms 221 that cooperatively define a retaining space 220 away from the socket 21 (i.e., facing inwardly toward an interior of the playard 1) for retaining the tube 11. The resilient arms 221 are contoured to the profile (cross-section, indicated as an oval shape in FIG. 3) of the tube 11. In one embodiment, the resilient arms 221 are disposed in a horizontal direction, and the retaining space 220 of the snap clip 2 is facing inwardly toward the tube 11. One of the resilient arms 221 has a distal end portion 222 extending away from the socket 21 and away from another of the resilient arms 221, such that the snap clip 2 can be easily mounted onto the tube 11 by being pushed toward the tube 11 (see the arrow in FIG. 3). In this embodiment, the distal end portions 222 of the resilient arms 221 are configured to bend outward with respect to the retaining space 220. In one embodiment, the snap clip 2 is configured as a one-piece component, and the snap clip 2 can be made of plastic through an injection-molding technique. In one embodiment, the canopy bow 3 is made of plastic or fiberglass by an extrusion technique. In one embodiment, the snap clip 2 can be made of metal. In one embodiment, the clip body 22 includes only one resilient arm 221 that define the retaining space 220 facing inwardly toward the interior of the playard 1.

Figure 4:
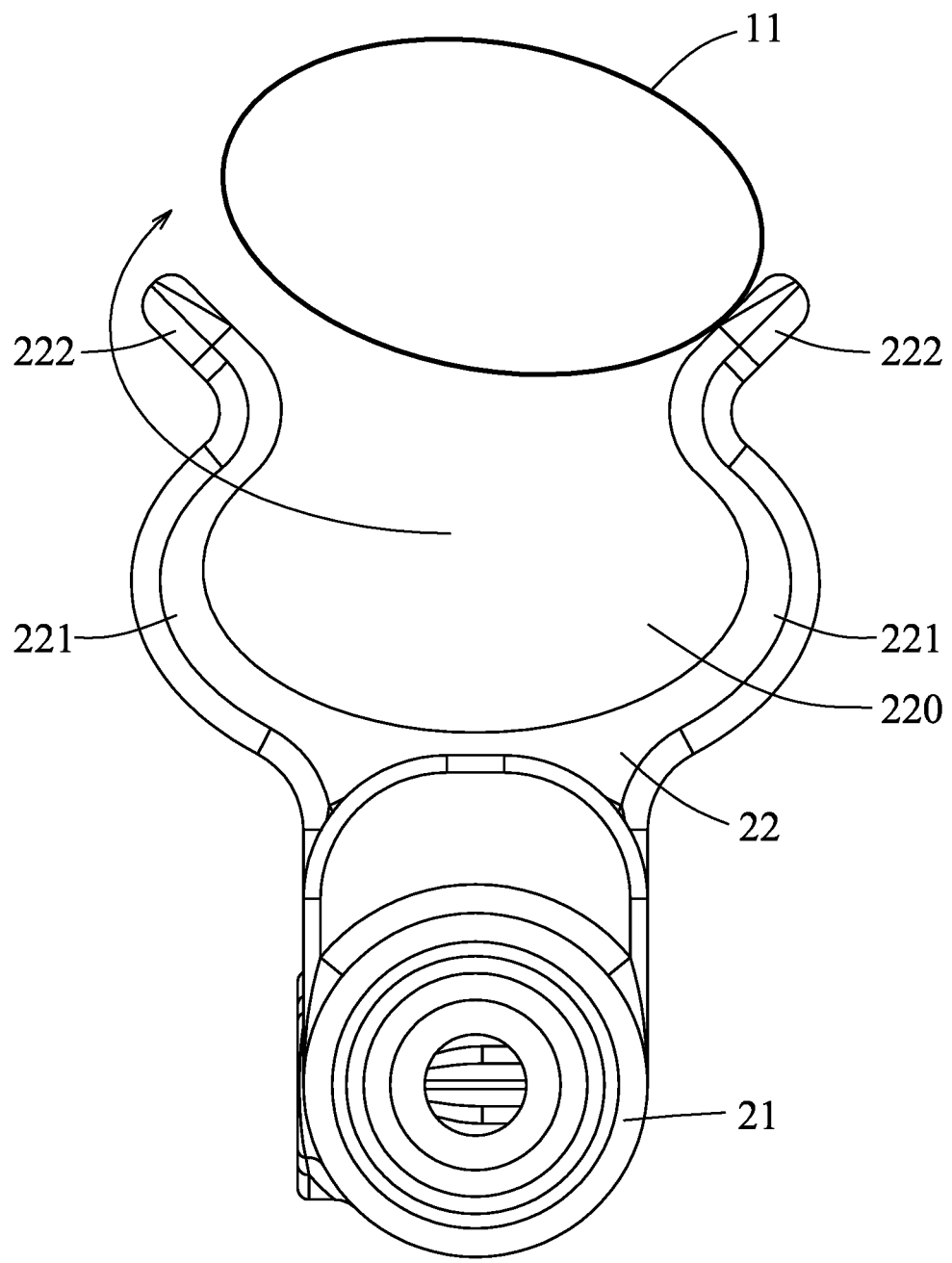
FIG. 4 is a top view similar to FIG. 3, illustrating the snap clip being rotated relative to the tube with a resilient arm thereof abutting against the tube.

Referring further to FIG. 4, alternatively, the snap clip 2 can be mounted onto the tube 11 by rotating the snap clip 2 relative to the tube 11 after one of the resilient arms 221 makes contact with the tube 11 (see the arrow in FIG. 4) as the snap clip 2 is being pushed toward the tube 11.

Referring back to FIG. 2, preferably, the clip body 22 is adapted to be mounted to the tube 11 at a position below the linking member 12. As such, a portion (U, see FIG. 2) of the canopy bow 3 above the tube 11 is movable with the snap clip 2 mounted on the tube 11, and the canopy bow assembly would not be unintentionally detached from the playard by wind or by the occupant of the playard pulling the canopy 5. The portion (U) of the canopy bow 3 above the tube 11 is movable without separating the snap clip 2 from the tube 11. In one embodiment, the mounting space 23 extends in a direction parallel to the tube 11, such that the canopy bow assembly partially overlaps a portion of the tube 11 (see "L" in FIG. 2).

Figure 5:
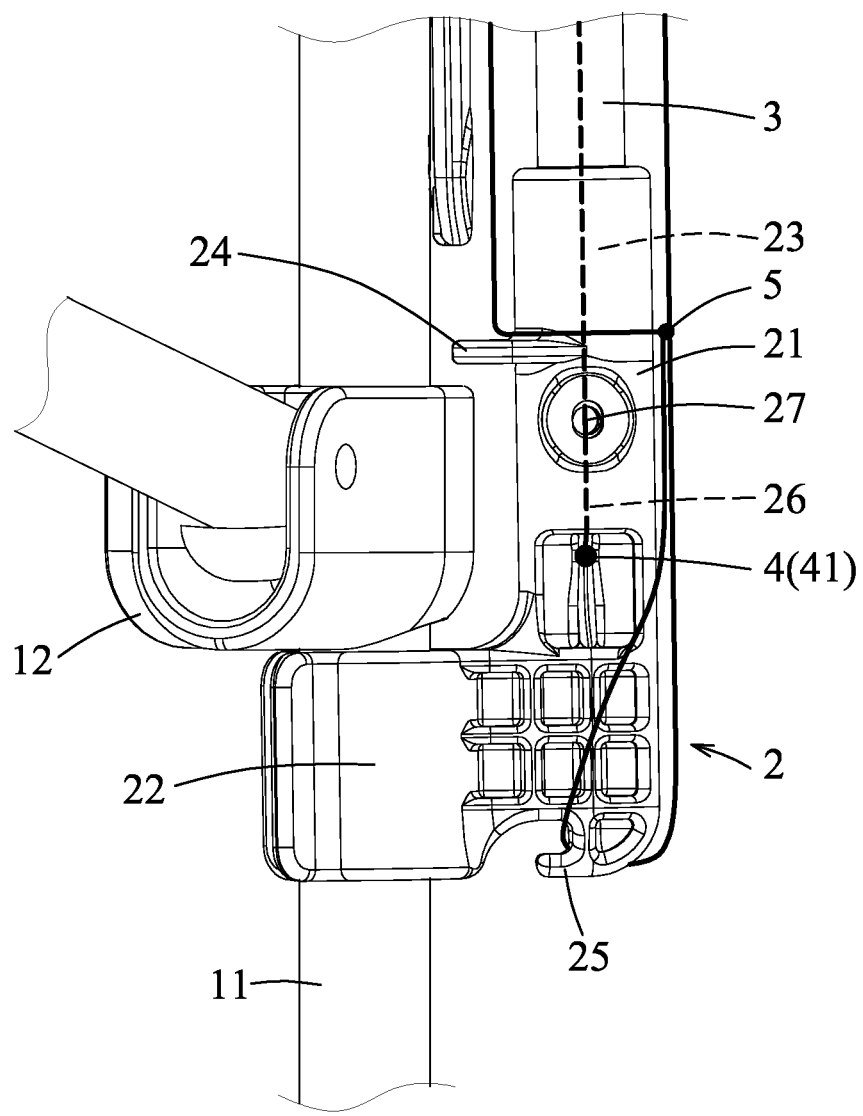
FIG. 5 is a fragmentary side view illustrating the canopy bow assembly.

Referring to FIG. 5, in one embodiment, the snap clip 2 further includes an alignment rib 24 disposed on the socket 21 and spaced apart from the clip body 22. The alignment rib 24 is adapted to abut against a surface of the linking member 12 that faces upwardly to cooperate with the clip body 22 to limit a range of movement of the snap clip 2 after the snap clip 2 is mounted to the tube 11, so as to prevent the snap clip 2 from sliding down the tube 11.

In one embodiment, the snap clip 2 further includes a hook portion 25 disposed on the socket 21 and adapted to hook the canopy 5 supported by the canopy bow 3.

In one embodiment, the socket 21 of the snap clip 2 further defines a tunnel 26 that is in spatial communication with the mounting space 23. The canopy bow assembly further includes a resilient cord 4 extending along the canopy bow 3 through the tunnel 26, and the resilient cord 4 terminates at a knot 41. The resilient cord 4 is configured to hold multiple canopy bows 3 together.

In one embodiment, the socket 21 of the snap clip 2 is formed with a mount hole 27. The canopy bow 3 can be screwed on the snap clip 2 by a screw (not shown) and the mount hole 27. In one embodiment, the canopy bow 3 is snap-fitted to the snap clip 2.

Figure 6:
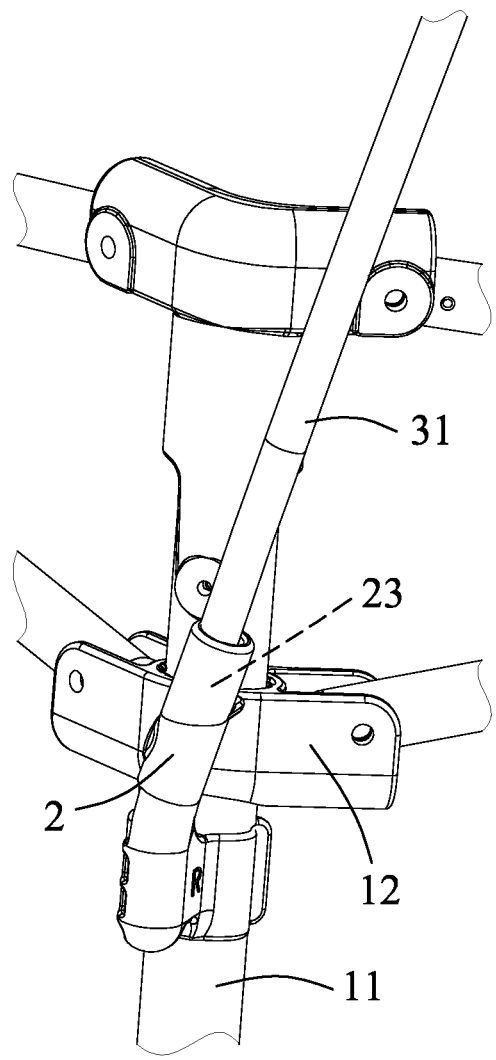
FIG. 6 is a partial view illustrating a modification of the canopy bow assembly according to the disclosure.
Figure 7:
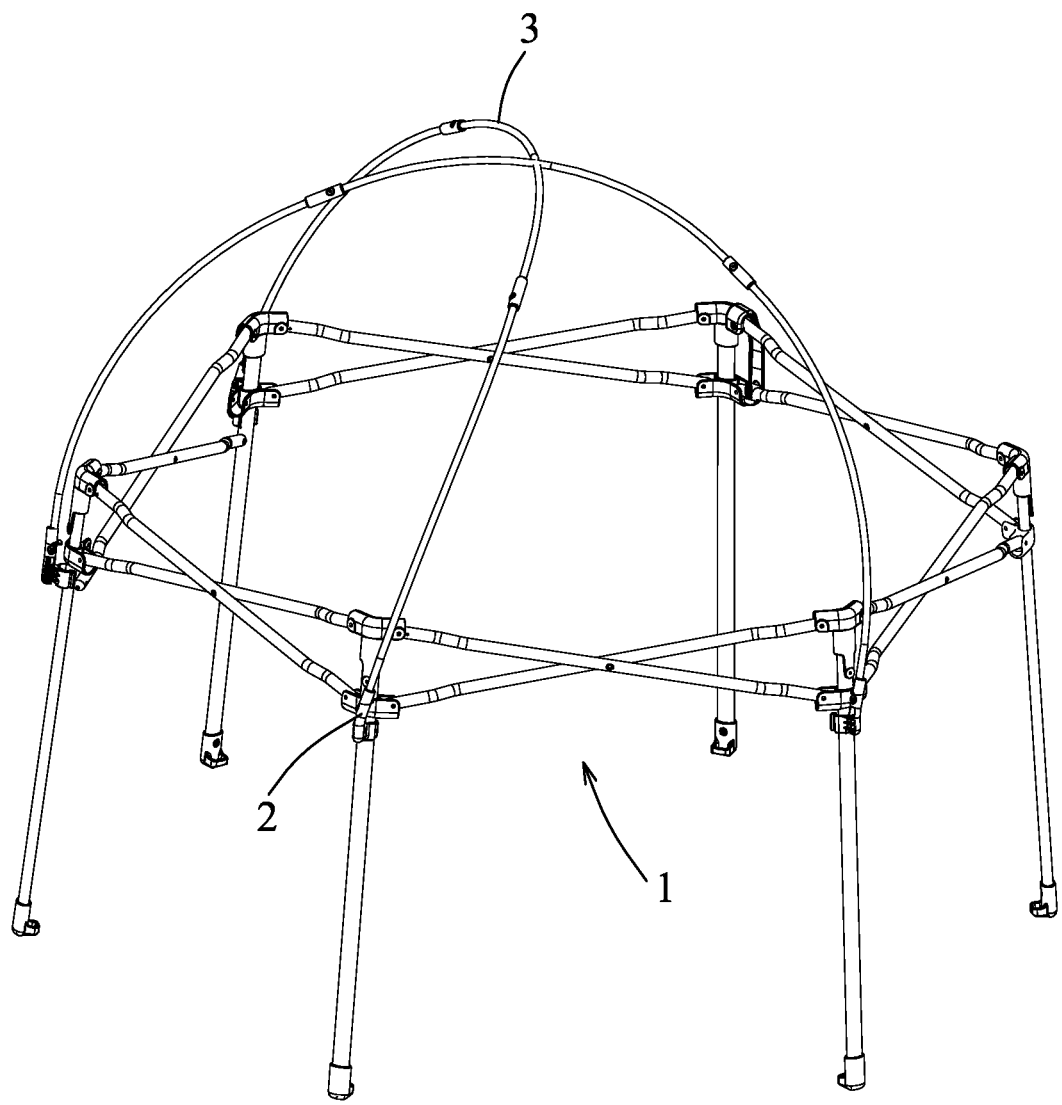
FIG. 7 is a perspective view illustrating the modification of the canopy bow assembly mounted to the article of furniture.

Referring to FIGS. 6 and 7, in a modification, the mounting space 23 of the snap clip 2 extends in a direction oblique to the tube 11 for the canopy bow 3 to be mounted thereto. As such, a canopy (not shown) supported by the canopy bow 3 serves to partially cover the playard 1.

Figure 8:
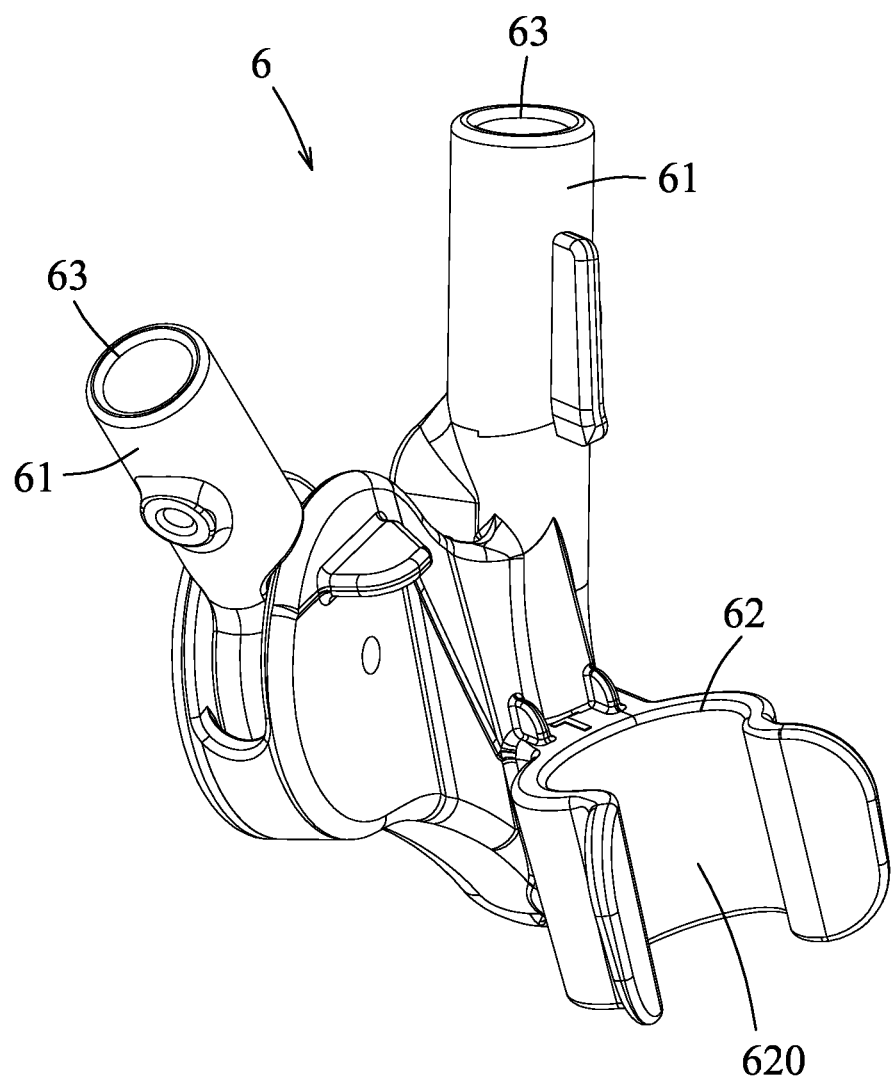
FIG. 8 is a perspective view illustrating a snap clip of a second embodiment of the canopy bow assembly according to the disclosure.
Figure 9:
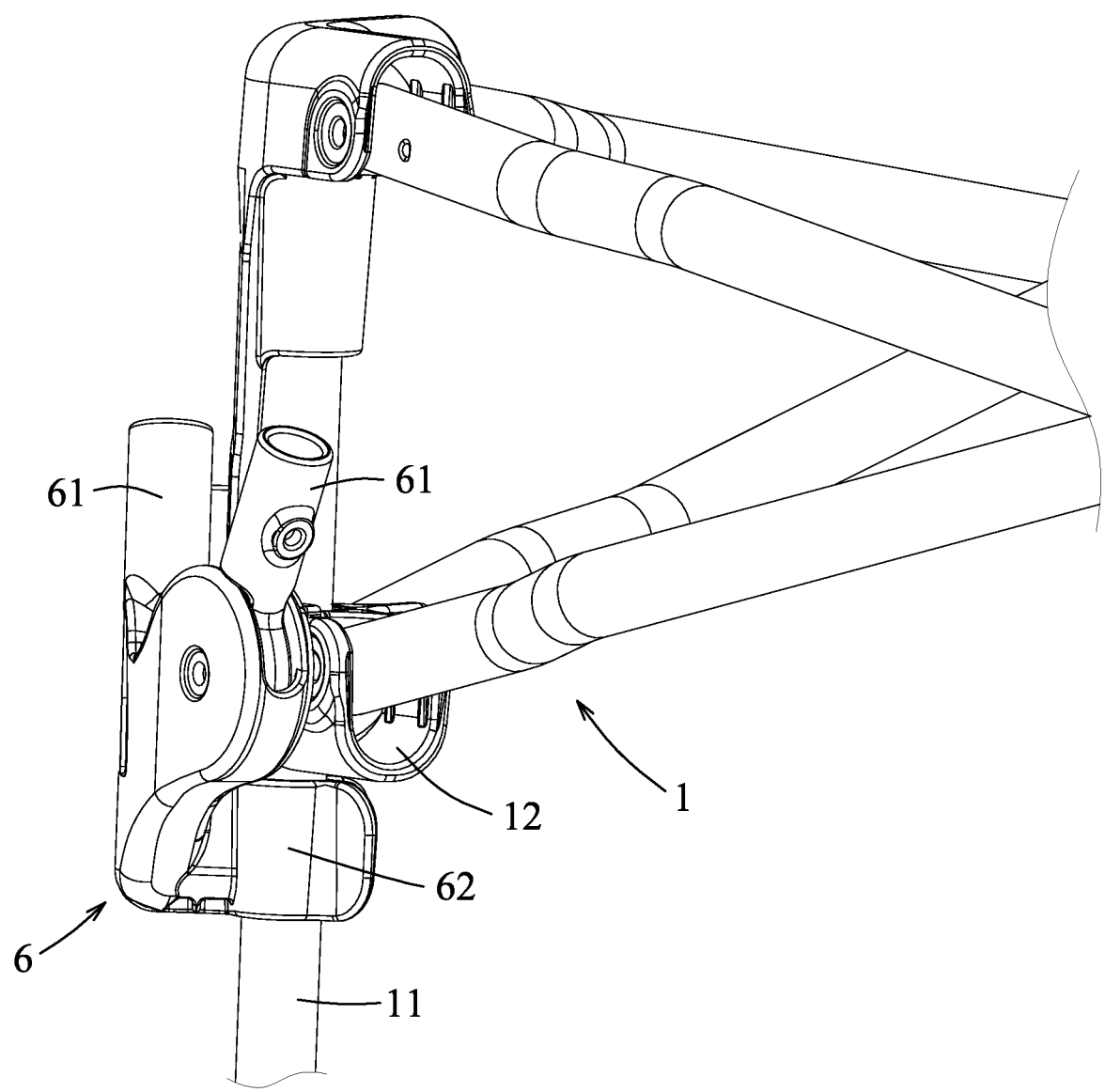
FIG. 9 is a partial view illustrating the snap clip mounted to an article of furniture.

Referring to FIGS. 8 and 9, the snap clip 6 of a second embodiment of the canopy bow assembly according to the disclosure includes two sockets 61, and a clip body 62 that is connected to the sockets 61. The clip body 62 defines a retaining space 620, and is removably mounted to the tube 11 of the playard 1. Each of the sockets 61 defines a mounting space 63 therein, such that sockets 61 of the snap clip 6 permits two canopy bows (not shown) to respectively mounted thereto. In one embodiment, the sockets 61 are pivotally interconnected such that the canopy bows mounted to the snap clip 6 are movable relative to each other.

The advantages of the disclosure are as follows: the retaining space 220, 620 of the snap clip 2, 6 is facing inwardly rather than facing downwardly, such that the canopy bow 3 is prevented from being easily pulled off or pulled inside by an occupant; and the canopy bow assembly can be attached to the article of furniture without any additional fasteners and without any alteration or modification to the article of furniture, so the canopy bow assembly according to the disclosure can be attached onto various kinds of furniture.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A snap clip adapted to mount a canopy bow to an article of furniture, the article of furniture including a tube, said snap clip comprising:
    a socket defining a mounting space adapted for the canopy bow to be mounted therein;
    a clip body connected to said socket and adapted to be removably mounted to the tube, said clip body defining a retaining space adapted to face inwardly toward an interior of the article of furniture and that is adapted to retain the tube; and
    a linking member mounted to the tube, wherein said snap clip further comprises an alignment rib disposed on said socket and spaced apart from said clip body, said alignment rib being adapted to abut against a surface of the linking member.

2. The snap clip as claimed in claim 1, wherein said clip body includes a resilient arm disposed in a horizontal direction.

3. The snap clip as claimed in claim 2, wherein said resilient arm has a distal end portion extending away from said socket.

4. The snap clip as claimed in claim 1, the article of furniture further including a linking member mounted to the tube, wherein said clip body is adapted to be mounted to the tube at a position below the linking member.

5. The snap clip as claimed in claim 1, further comprising a hook portion disposed on said socket and adapted to hook a canopy supported by the canopy bow.

6. The snap clip as claimed in claim 1, wherein said mounting space extends in a direction parallel to the tube when mounted thereto.

7. The snap clip as claimed in claim 1, wherein said mounting space extends in a direction oblique to the tube when mounted thereto.

8. The snap clip as claimed in claim 1, wherein said clip body includes two resilient arms both disposed in a horizontal direction and the tube is disposed in a vertical direction.

9. The snap clip as claimed in claim 8, wherein the article of furniture further includes a linking member mounted to the tube, wherein said two resilient arms are each configured to be mounted to the tube at a position below the linking member.

10. The snap clip as claimed in claim 1, wherein the socket and the retaining space are offset from each other in both a vertical direction and a horizontal direction.

11. A canopy bow assembly adapted to be mounted to an article of furniture, the article of furniture including a tube, said canopy bow assembly comprising:
   a snap clip including a socket and a clip body, said socket defining a mounting space therein, said clip body being connected to said socket and adapted to be removably mounted to the tube, said clip body defining a retaining space adapted to face inwardly toward an interior of the article of furniture and that is adapted to retain the tube;
   a canopy bow mounted in said mounting space of said socket, and adapted to support a canopy; and
   a linking member mounted to the tube, wherein said snap clip further includes an alignment rib disposed on said socket and spaced apart from said clip body, said alignment rib being adapted to abut against a surface of the linking member that faces upwardly.

12. The canopy bow assembly as claimed in claim 11, wherein said clip body includes a resilient arm disposed in a horizontal direction.

13. The canopy bow assembly as claimed in claim 12, wherein said resilient arm of said snap clip has a distal end portion extending away from said socket.

14. The canopy bow assembly as claimed in claim 11, the article of furniture further including a linking member mounted to the tube, wherein said clip body is adapted to be mounted to the tube at a position below the linking member.

15. The canopy bow assembly as claimed in claim 11, wherein said snap clip further includes a hook portion disposed on said socket and adapted to hook the canopy supported by said canopy bow.

16. The canopy bow assembly as claimed in claim 11, wherein said mounting space extends in a direction parallel to the tube when mounted thereto.

17. The canopy bow assembly as claimed in claim 11, wherein said mounting space extends in a direction oblique to the tube when mounted thereto.

18. The canopy bow assembly as claimed in claim 11, wherein the socket and the retaining space are offset from each other in both a vertical direction and a horizontal direction.

19. A canopy bow assembly adapted to be mounted to an article of furniture, the article of furniture including a tube, said canopy bow assembly comprising:
   a snap clip including a socket and a clip body, said socket defining a mounting space therein, said clip body being connected to said socket and adapted to be removably mounted to the tube, said clip body defining a retaining space that is facing inwardly toward an interior of the article of furniture and that is adapted for retaining the tube; and
   a canopy bow mounted in said mounting space of said socket, and adapted to support a canopy;
   wherein said socket further defines a tunnel being in spatial communication with said mounting space, said canopy bow assembly further comprising a resilient cord extending along said canopy bow into said tunnel to terminate at a knot.

\* \* \* \* \*